US012772019B2

(12) United States Patent
Von Saint-George et al.

(10) Patent No.: US 12,772,019 B2
(45) Date of Patent: Oct. 20, 2026

(54) SEAMLESS REVERBERATION TRANSITION IN VIRTUAL VENUES

(71) Applicant: HARMAN BECKER AUTOMOTIVE SYSTEMS GmbH, Karlsbad-Ittersbach (DE)

(72) Inventors: Matthias Von Saint-George, Pfinztal (DE); Arndt Hensgens, Pforzheim (DK); Georg Spielbauer, Haselbach (DE); Andreas Renhorn, Jonsered (SE)

(73) Assignee: Harman Becker Automotive Systems GmbH, Karlsbad-Ittersbach (DE)

( * ) Notice: Subject to any disclaimer, the term of this patent is extended or adjusted under 35 U.S.C. 154(b) by 177 days.

(21) Appl. No.: 18/669,943

(22) Filed: May 21, 2024

(65) Prior Publication Data

US 2024/0397278 A1 Nov. 28, 2024

(30) Foreign Application Priority Data

May 22, 2023 (EP) .................................... 23174456

(51) Int. Cl.

*H04S 7/00* (2006.01)
*H04R 3/12* (2006.01)
*H04S 3/00* (2006.01)

(52) U.S. Cl.

CPC .............. *H04S 7/305* (2013.01); *H04S 3/008* (2013.01); *H04S 7/303* (2013.01); *H04S 7/307* (2013.01); *H04S 2400/01* (2013.01); *H04S 2400/15* (2013.01)

(58) Field of Classification Search

USPC .. 381/300, 303, 307, 56, 57, 58, 61, 62, 63, 381/66, 95, 98, 100–104, 107, 108, 122, 381/124

See application file for complete search history.

(56) References Cited

U.S. PATENT DOCUMENTS

| | | | | |
|---|---|---|---|---|
| 11,878,246 | B1 * | 1/2024 | Smith | H04S 7/305 |
| 12,342,151 | B2 * | 6/2025 | Shirakihara | H04R 3/12 |
| 2021/0120358 | A1 * | 4/2021 | Elby | H04S 7/303 |

(Continued)

FOREIGN PATENT DOCUMENTS

| | | | | |
|---|---|---|---|---|
| EP | 4398607 | A1 * | 7/2024 | H04S 7/305 |
| WO | WO-2023208333 | A1 * | 11/2023 | H04S 7/306 |
| WO | WO-2024084950 | A1 * | 4/2024 | H04S 7/307 |

*Primary Examiner* — Qin Zhu
(74) *Attorney, Agent, or Firm* — Artegis Law Group, LLP

(57) ABSTRACT

A computer-implemented method for audio signal processing involves receiving an input audio signal, obtaining reverberation parameters associated with two distinct acoustic environments, and simultaneously generating early reflections signals for each acoustic environment. These early reflections signals are then combined through a fading process to create a continuous transitional early reflections signal, which transitions between the two environments according to the fading process. Additionally, a reverberation tail is generated and combined with the transitional early reflections signal. The output audio signal is provided as a combination of the direct input audio signal, the transitional early reflections signal, and the reverberation tail signal, which is switched discretely, resulting in a seamless and immersive listening experience for the user.

20 Claims, 3 Drawing Sheets

(56) References Cited

U.S. PATENT DOCUMENTS

| | | | | |
|---|---|---|---|---|
| 2023/0143857 | A1* | 5/2023 | Laitinen | H04S 7/30 381/92 |
| 2024/0007820 | A1* | 1/2024 | Pelzer | H04S 7/305 |
| 2024/0244388 | A1* | 7/2024 | Ye | G10L 19/008 |
| 2024/0388867 | A1* | 11/2024 | Disch | G10L 19/167 |
| 2024/0422496 | A1* | 12/2024 | Ishizuka | G10K 15/08 |

* cited by examiner

SEAMLESS REVERBERATION TRANSITION IN VIRTUAL VENUES

CROSS-REFERENCE TO RELATED APPLICATIONS

This application claims priority to the European Patent Application titled, "Seamless Reverberation Transition in Virtual Venues," filed on May 22, 2023, and having Application No. 23174456.6. The subject matter of this related application is hereby incorporated herein by reference.

TECHNICAL FIELD

Various examples of the disclosure generally relate to the field of audio processing. Various examples of the disclosure specifically relate to virtual venue reverberation, and more specifically to a method for seamless reverberation transition between different reverberation settings while enabling continuous playback.

BACKGROUND

Audio processing has become an essential aspect of various industries, including entertainment systems in vehicles, online meetings, gaming, and virtual reality. One of the critical components of audio processing is the simulation of room acoustics, in other words reverberation. Reverberation is the persistence of sound in a particular space after the original sound has been produced. In order to create an immersive and realistic listening experience, audio engineers often employ various reverberation technologies that simulate different acoustic environments.

Traditional reverberation technologies, however, have known limitations. When a user wants to transition between virtual venues, or different reverberation settings, or wants to adjust the listening experience, the audio often enters a short mute phase or experiences abrupt changes in the reverberation characteristics. This can result in an undesirable break in the audio playback, which affects the overall listening experience and disrupts the continuity of the sound.

SUMMARY

Accordingly, there is a need for advanced techniques for virtual venue reverberation, which alleviate or mitigate at least some of the above-identified restrictions and drawbacks.

This need is met by the features of the independent claims. The features of the dependent claims define further advantageous examples.

In the following, the solution according to the present disclosure will be described with regard to the claimed reverberation methods as well as with regard to the claimed audio systems, wherein features, advantages, or alternative embodiments can be assigned to the other claimed objects and vice versa. In other words, the claims related to the audio systems can be improved with features described in the context of the methods, and the methods can be improved with features described in the context of the audio systems.

A computer-implemented method is provided for processing an input audio signal. The method can for example be carried out by an audio system comprising a processing unit, or by a computing device.

The method comprises receiving an input audio signal, to which reverberation is to be applied, and which can be output in the following to a user with reverberation using loudspeakers.

A first set of reverberation parameters associated with a first acoustic environment is obtained. A second set of reverberation parameters associated with a second acoustic environment, different from the first set of reverberation parameters, is further obtained.

The input audio signal is processed based on the first set of reverberation parameters to generate a first early reflections signal, and based on the second set of reverberation parameters to generate a second early reflections signal, simultaneously. In other words, the first and second set of reverberation parameters are used, e.g. in a calculation or processing procedure or step, to generate the first and second early reflections signal respectively, in parallel.

Each of the first and second early reflections signals comprises a respective synthesized audio signal representing only the initial sound reflections in the respective acoustic environment, which may refer to sound reflections occurring before a predetermined time threshold after the direct signal and/or the first reflections in the acoustic environment. They may not comprise further signal components associated with reverberation tail signals or multiple/diffuse reflections in the acoustic environment. The first and second early reflections signals are combined with each other to generate a combined signal including the first and second early reflections signals, which transitions from the first to the second early reflections signal. The combining fades from the first to the second early reflections signal, in other words, a fading process is used to combine to generate a transitional early reflections signal, which accordingly comprises a transition from the first to the second early reflection signal in accordance with the fading process. The transition can be quasi continuously or in small steps with a step size smaller than the listener can differentiate.

An output audio signal is provided based on, or using, the transitional early reflections signal. The output audio signal can comprise, among other signal components, a combination of the direct input audio signal and the transitional early reflections signal.

According to the general idea, the disclosed method is based on splitting the reverberation process into at least two separate parts or signals, e.g. early reflections and reverberation tail signal. By processing these two parts independently, wherein only the first signal is provided for different acoustic environments in parallel, the method can provide to users an uninterrupted audio experience while changing reverberation parameters.

The first and second early reflections signals comprise a respective synthesized audio signal representing only the initial sound reflections in the respective acoustic environment, that is the reverberation characteristics or reflections of a sound event that occur until a predetermine time interval or period of time after the sound event in the direct signal, and not the reverberation characteristics or reflections that occur after multiple reflections.

The early reflections signal may refer to a first part of a reverberation signal, which is provided in parallel for two different acoustic environments. The reverberation tail signal may refer to a second reverberation signal, which complements the first reverb signal and/or includes effects not included in the first reverberation signal, which at least partly is not included in the first signal. Therefore, the reverberation tail signal includes reverberation effects, which are not provided in parallel, but switched between two acoustic environments. In other words, when providing the early reflections signal, the reverberation tail signal is not calculated nor included.

The early reflections signal of the reverberation process represents the initial sound reflections within a given acoustic environment. Early reflections, also known as initial sound reflections, are the first series of echoes that reach the listener's cars shortly after the direct sound. These reflections occur as the sound waves bounce off various surfaces within the acoustic environment, such as walls, ceilings, and objects. The early reflections signal is characterized by its short delay times and relatively high amplitude, compared to the reverberation tail signal. These initial reflections contribute significantly to the listener's perception of the environment's size, shape, and material properties.

In other words, early reflections may include only the first, or a first predefined number of, sound reflections in the respective simulated acoustic environment that reach the listener's cars after a direct sound arrives from a sound source. These reflections occur as the sound waves bounce off various surfaces within the acoustic environment, such as walls, ceilings, and objects, wherein multiple reflections may not be included. In terms of simulation, early reflections may represent a limited number of sound reflections before the sound arrives at the listener. To differentiate early reflections from the reverberation tail, a predetermined threshold value can be established, representing for example the maximum number of reflections or time delay before the sound is considered part of the reverberation tail signal.

These early reflections occur before the more prolonged sound decay, known as the reverberation tail. On the other hand, the reverberation tail, also described as diffuse reflections or reverberant decay, represents the subsequent sound reflections and decay characteristics that occur within the acoustic environment following the early reflections. The reverberation tail signal is characterized by its longer delay times and gradually decreasing amplitude. As the sound waves continue to bounce around the environment, they lose energy and become more diffused, eventually fading out entirely. The reverberation tail signal contributes to the listener's perception of the environment's spaciousness and overall ambience.

In other words, the reverberation tail signal, including multiple reflections or diffuse reflections, refers to the subsequent sound reflections to the early reflections, and decay characteristics that occur within the acoustic environment following the early reflections. These reflections may for example have gradually decreasing amplitude as the sound waves continue to bounce around the environment, compared to the early reflections. In sound propagation simulation, the reverberation tail may comprise all the effects and reflections after the predetermined threshold value, representing the point in time or delay time, number of subsequent reflections, at which early reflections transition to the more diffuse, late reflections. The reverberation tail contributes to the listener's perception of the environment's spaciousness and overall ambience. Therefore, in contrast, the reverberation tail represents the late sound reflections and decay characteristics that occur within the acoustic environment, following the early reflections. The processing method does not calculate the reverberation tail simultaneously for both environments. Instead, it switches between the reverberation tail signals of the two environments, or any intermediate step in between, during continuous playback.

Accordingly, a way to describe the separation of early reflections and the reverberation tail is to define them as two distinct parts of the overall reverberation process. Early reflections can be considered as the first-occurring sound reflections within an acoustic environment, while the reverberation tail comprises the subsequent late sound reflections and decay characteristics. A threshold value or another distinctive border can be used to differentiate these two components.

For example, the most prominent reflection peaks for an acoustic environment can be detected for an audio signal and remodeled by the early reflection network.

For example, for each of a plurality of sound events included in the input audio, the early reflections signal can be described as the synthesized audio signal that represents the initial sound reflections occurring within an acoustic environment, characterized by their rapid arrival at the listener's position after the direct sound, typically within the first 50 milliseconds. Whereas the reverberation tail signal can be described as synthesized audio signal that represents the late sound reflections and decay characteristics within an acoustic environment, characterized by their occurrence after the early reflections and extending over a more extended period, typically beyond 50 milliseconds from the direct sound.

A time interval, or time period, as specified by a threshold value, between the direct sound, early reflections and the reverberation tail may be measured based on the time difference between the direct sound and the reflections. Early reflections signal and reverberation tail signal represent the same sound event that follows the direct sound in a reverberant space. The distinction between early reflections and reverberation tail is based on their arrival times and characteristics. Early reflections are the first set of sound reflections, typically arriving at the listener's position within the first 50 milliseconds after the direct sound. The reverberation tail consists of the late sound reflections and decay characteristics, occurring after the early reflections and extending over a more extended period, typically beyond 50 milliseconds from the direct sound. So, the time period represents and characterizes a transition from the early reflections phase to the reverberation tail phase within the same continuous sound event in a reverberant space.

This establishes a clear distinction between the early reflections signal and the reverberation tail signal using a predetermined threshold value as a time period value, which separates the two signals based on reverberation effects for specific sound events in the direct audio signal. In this definition, the threshold value is typically set at 50 milliseconds. This means that sound reflections occurring within the first 50 milliseconds after the direct sound are considered part of the early reflections signal, while sound reflections and decay characteristics extending beyond 50 milliseconds are categorized as the reverberation tail signal.

It is to be understood that the predetermined threshold value can be adjusted according to specific requirements or to emphasize certain aspects of the acoustic environment. For example, 40 milliseconds, which may be suitable for smaller acoustic environments or applications where early reflections are of particular importance in shaping the perceived space. For example, 60 milliseconds, which could be appropriate for larger acoustic environments where the early reflections are more spread out and require a longer time window to capture their full effect. For example, 75 milliseconds, wherein, by extending the threshold value to 75 milliseconds, the early reflections signal may provide a more detailed representation of the initial sound reflections in environments with complex geometry or a higher degree of diffusion. For example, 30 milliseconds, which could be used in applications where the focus is on capturing the most immediate and prominent early reflections, emphasizing the direct sound's spatial impression. For example, 100 milliseconds, which may be useful in situations where the acoustic environment's reverberant properties are less critical, and the early reflections signal plays a more dominant role in shaping the overall sound.

By providing a predefined, or predetermined, threshold value separating the early reflections signal and the reverberation tail signal, the audio signal processing method can be tailored to suit different acoustic environments and applications, ensuring an optimal balance between spatial characteristics and reverberant qualities.

In general, the disclosed audio signal processing method receives an input audio signal and obtains two sets of reverberation parameters, each associated with a unique acoustic environment. The method processes the input audio signal based on these parameters, generating a first and a second early reflections signal simultaneously. These synthesized audio signals represent the initial sound reflections in their respective environments.

The method then combines the first and second early reflections signals through a fading process, producing a transitional early reflections signal. This transitional signal encompasses the transition from the first to the second early reflections signal according to the fading process, or to any intermediate step defined in the Reverb Tail LUT, i.e. the fading to any intermediate blending step between two rooms, even from one intermediate blending step to another intermediate blending step. The output audio signal consists of a combination of the direct input audio signal and the transitional early reflections signal, providing users with continuous audio playback during the transition.

In this approach, the early reflections and reverberation tail are not calculated within the same process. This distinction allows for parallel processing of early reflections signals for two different acoustic environments. As a result, the audio experience can remain uninterrupted while the listener transitions between the two environments. Meanwhile, the reverberation tail signals are not processed simultaneously; they can be switched during continuous playback, however it would also be possible to fade between them.

By separating the reverberation process into early reflections and reverberation tail, the method provides a more seamless audio experience when changing acoustic environments. The transitional early reflections signal is generated by simultaneously calculating early reflections for both environments, then fading between them. This approach ensures that the audio output remains uninterrupted during the transition. The audio signal processing method's innovative approach to separating early reflections and reverberation tail offers an improved audio experience for users while changing between different acoustic environments. By independently processing these two components, the method ensures a smooth transition while maintaining continuous audio playback. This distinction makes it possible to enjoy an uninterrupted audio experience when adjusting reverberation parameters, enhancing the overall listening experience. Therefore, the advantage of the disclosed method is that it enables a continuous and seamless transition between different acoustic environments while maintaining uninterrupted audio playback. By processing the input audio signal based on two sets of reverberation parameters and generating two early reflections signals simultaneously, the method allows for a smooth blending of the acoustic characteristics of different environments, thereby providing an immersive audio experience without any disruption in the playback.

Reverberation parameters may refer to the characteristics of a given acoustic environment that influence how sound reverberates within that environment. The term early reflections refers to the initial sound reflections that occur shortly after a sound is emitted within an acoustic environment. The transitional early reflections signal is a continuous and seamless audio signal representing a blend of initial sound reflections in the first and second acoustic environments, generated by combining the first and second early reflections signals through a fading process, which can also be referred to as a blended or mixed signal representing a transition between the two acoustic environments.

The first and the second early reflections signals can be generated by simulating the first-occurring sound reflections of the input audio signal within the respective acoustic environment. Simulating the first-occurring sound reflections means replicating the initial reflections of sound waves within a specific environment. This may be achieved using mathematical models and algorithms that take into account the geometry, surfaces and materials of the acoustic environment. By accurately simulating the first-occurring sound reflections, the method provides a realistic representation of the acoustic properties of different environments, improving the quality of the audio experience for the user.

The output audio signal can be continuously output to the user, while transitioning from the first early reflections signal to the second early reflections signal. Continuous output refers to the uninterrupted playback of the audio signal during the transition between different acoustic environments. This ensures that the user does not experience any gaps or disruptions in the audio playback. Continuous output maintains the immersion of the user in the audio experience, providing a seamless transition between different environments without any interruptions.

The direct input audio signal can be further processed based on the first set of reverberation parameters to generate a first reverberation tail signal and based on the second set of reverberation parameters to generate a second reverberation tail signal. The first and second reverberation tail signals can be provided subsequently or simultaneously to each other, and/or to the first and second early reflections signals. The output audio signal can be provided, which includes a combination of the direct input audio signal, the transitional early reflections signal, and the first reverberation tail signal. During the continuous playback of the output audio signal, and/or during the gradual transition from the first to the second early reflection signal, the first reverberation tail signal can be switched to the second reverberation tail signal. The output audio signal then includes the direct input audio signal, the transitional early reflections signal, and the second reverberation tail signal after the switch.

Reverberation tail signals represent the late sound reflections and decay characteristics occurring within a specific acoustic environment, subsequent to the early reflections. Processing the direct input audio signal based on different sets of reverberation parameters generates distinct reverberation tail signals for each environment. Switching reverberation tail signals during continuous playback allows for a smooth and immersive transition between different acoustic environments, maintaining a consistent audio experience for the user, while reducing processing and memory resources. In other words, the terms early reflections and reverberation tail are used in the field of audio processing and acoustics to describe the different components of an output audio signal representing reverberation in a room or an acoustic environment. It would also be possible to transition between the first and second reverberation tail signals in a similar way as for the early reflections signals.

Examples of real acoustic environments could include concert halls, churches, stadiums, or small rooms, each with distinct reverberation characteristics due to their different sizes, shapes, and materials. In a concert hall, for example, the early reflection signals would capture the initial reflections from the walls, floor, and ceiling, while the reverberation tail signals would represent the sustained reverberations and decay that give the hall its characteristic sound.

Acoustic environments can be designed to simulate specific real-world spaces or entirely new, unique environments. Examples of virtual venues might include a virtual representation of a famous concert hall, a fantastical cavern with otherworldly reverberation properties, or a digital simulation of an intimate jazz club. In these cases, the early reflection signals and reverberation tail signals would be generated based on the reverberation parameters associated with the virtual environment, providing the listener with a realistic and immersive audio experience within the simulated space.

A microphone signal can further be received, which can include an audio signal from the user. The first and second reverberation tail signals can be generated based on the microphone signal as well. The microphone signal refers to the audio input captured by a microphone from the user, which may include the user's voice or other sounds. By incorporating the microphone signal into the generation of reverberation tail signals, the method ensures that the user's input is also processed according to the changing acoustic environments. This allows for a more realistic and immersive audio experience, as the user's input is dynamically processed along with the rest of the audio signal, adapting to the changing acoustic environments.

In some examples, the microphone signal can be only applied to the reverb tail. This causes the microphone signal being interrupted when fading. In other examples, the microphone signal can also applied to the early reflection network, which requires a low latency system EQ to provide small delays also in real time.

Processing the microphone signal based on the first or second set of reverberation parameters can take into account a position of the user in the respective acoustic environment. The position of the user refers to the user's location within a virtual or real acoustic environment. By considering the user's position when processing the microphone signal, the method can more accurately simulate the sound reflections and reverberation characteristics that would occur in the respective environment. Taking the user's position into account ensures a more accurate and immersive audio experience, as it considers the user's unique perspective within the acoustic environment.

The transitional early reflections signal can be a continuous and seamless audio signal representing a blend of initial sound reflections in the first and second acoustic environments. A continuous and seamless audio signal refers to an audio output that smoothly transitions between the first and second acoustic environments without any interruptions or noticeable changes in the audio quality. This provides a more immersive and realistic audio experience, as the user experiences a smooth and uninterrupted transition between different acoustic environments, maintaining the overall consistency of the audio playback.

The first acoustic environment can correspond to a first virtual or real venue or scene, and the second acoustic environment corresponds to a second virtual or real venue or scene. Alternatively, the second acoustic environment can correspond to a user-induced parameter change of at least one parameter of the first set of parameters. Virtual venues are digitally created acoustic environments that can be simulated using reverberation parameters. A user-induced parameter change refers to an adjustment made by the user to one or more parameters of the reverberation parameters, which can affect the characteristics of the acoustic environment. This offers greater flexibility and customization for the user, as they can transition between predefined virtual venues or make adjustments to the parameters of an existing environment, allowing them to tailor the audio experience to their preferences.

Reverberation parameter changes can be introduced by a user through an interface or control system that allows them to adjust various aspects of the reverberation parameters associated with the first acoustic environment. Such adjustments may include modifying the room size, shape, surface materials, or the listener's position within the environment. The user may make these adjustments using physical controls, such as knobs or sliders, or through a software interface that offers a visual representation of the acoustic environment and the associated parameters.

In traditional audio processing systems, changing the reverberation parameters of an environment typically results in short interruptions in the audio playback. These interruptions occur because the system needs to recalculate and reload the early reflection and reverberation tail signals based on the new parameters. During this process, the audio output may be muted or disrupted, causing an undesirable break in the audio experience for the user.

The disclosed embodiments improve upon this limitation by splitting the processing of the reverberation tail and early reflection signals. By generating and providing the first and second early reflection signals simultaneously, the method allows for a seamless and continuous audio playback while the user adjusts the parameters of the acoustic environment. As the user dials in the new parameters, the transitional early reflections signal is generated through a fading process that smoothly blends the first and second early reflection signals. This ensures that the main audio and early reflections are not interrupted, providing a seamless audio experience. Since the early reflections and main audio signals remain uninterrupted, the overall impact of the reverberation tail interruption is minimized, resulting in a more immersive and smooth audio experience.

The first early reflections signal and the second early reflections signal can be generated and/or provided simultaneously. Providing the early reflections signals simultaneously means that both signals are generated and available for processing at the same time. This enables the smooth and seamless blending of the early reflections signals during the transition between acoustic environments. Simultaneous provision of early reflections signals ensures a more immersive and consistent audio experience, as the user can smoothly transition between different acoustic environments without any interruptions or noticeable changes in the audio quality.

The computer-implemented method can include compensating for latency in the transitional early reflections signal. The direct audio signal, early reflections signal, and reverberation tail signal are synchronized based on a latency control signal. Latency compensation ensures that the different audio signals remain synchronized during the transition between environments. The latency control signal can be generated by analyzing the processing delays in the audio processing chain. This allows for a seamless audio experience, as the audio signals remain synchronized, preventing any noticeable artifacts or interruptions in the audio playback.

The generation of the first and second reverberation tail signals can be controlled using a reverberation tail control signal. The control signal is based on a lookup table containing the reverberation tail parameters of the first and second acoustic environments. The reverberation tail control signal can be a data-driven approach to managing the tail parameters of the reverberation effect. The lookup table can store different sets of parameters for various environments, allowing for smooth transitions between them. This approach enables a more accurate and customizable audio experience, as it allows for precise control over the reverberation tail characteristics in different virtual venues.

An equalization filter can be applied to the first and second reverberation tail signals. The equalization filter shapes the tonal character of the reverberation tail. The equalization filter can adjust the frequency response of the reverberation tail signals, providing more control over their tonal character. This can help to better match the desired sound of the virtual environment. Applying an equalization filter to the reverberation tail signals enhances the overall audio experience by allowing for a more realistic and immersive sound when transitioning between virtual venues.

The input audio signal can be a multi-channel audio signal. A multi-channel audio signal provides a more immersive and spatially accurate sound experience. This can include formats such as stereo, surround sound, or even more advanced 3D audio formats. Processing multi-channel audio signals allows for a more engaging and realistic audio experience in different virtual venues, providing users with a richer and more immersive listening experience.

The fading process can be adaptive based on user input controlling the blend of the first and second early reflections signals in the transitional early reflections signal. Adaptive fading allows users to control the blending of the early reflections signals, giving them more control over the transition between virtual venues. This can be done using various user interface elements or input devices. By providing adaptive fading, users can achieve a more personalized audio experience, allowing for smoother transitions and more control over the characteristics of the audio playback.

The computer-implemented method can include routing the direct input audio signal and the transitional early reflections signal to a multi-channel 3D surround system. This generates a 3D audio signal, which is provided to a system equalization filter for reproduction room compensation on a loudspeaker level. This generates the output audio signal. 3D audio signal processing and room compensation techniques can enhance the spatial accuracy of the audio playback, providing a more immersive and realistic audio experience. This can be achieved using various equalization and spatial processing algorithms. Incorporating 3D audio and room compensation techniques ensures a more accurate and immersive audio experience for users, regardless of their specific listening environment.

The first and second sets of reverberation parameters can be derived from a database of real-world or virtual acoustic environments. The database can store the reverberation parameters for various environments, allowing for accurate reproduction of their acoustic characteristics. This can include real-world venues or virtual environments designed for specific purposes. By utilizing a database of reverberation parameters, the system can provide a more accurate and realistic audio experience, allowing users to immerse themselves in a wide range of virtual venues.

These methods or any combination of these methods can, for example, be carried out by an audio signal processing system, computing device or an audio system as will be described in the following. Such system of device can be adapted to perform any method or combination of methods as described in the present disclosure.

A corresponding audio system is provided, which is adapted for processing an audio signal by performing the following steps. The audio system comprises at least one processor, memory, and optionally at least one loudspeaker and at least one microphone. The at least one loudspeaker and/or microphone can be arranged at predefined positions around a user, which can listen to the audio signal played back by the audio system and can generate audio input through the at least one microphone.

In a step of receiving an input audio signal, the audio system's processing unit acquires the audio signal to be output to a user with reverberation. This signal and optionally a microphone signal can be used for creating an immersive audio experience in virtual environments.

In a step of obtaining a first set of reverberation parameters, the system retrieves parameters associated with a first acoustic environment. These parameters define the characteristics of the reverberation effect in the first acoustic environment.

In a step of obtaining a second set of reverberation parameters, the system retrieves parameters associated with a second acoustic environment, which is different from the first environment. These parameters define the characteristics of the reverberation effect in the second acoustic environment.

In a step of processing the input audio signal, the audio system processes the input audio signal based on the first and second sets of reverberation parameters. This generates a first early reflections signal for the first acoustic environment and a second early reflections signal for the second acoustic environment. Each early reflections signal comprises a synthesized audio signal representing initial sound reflections in their respective environments, and to not comprise signals representing reverberation tail signals, i.e. later occurring reverberation effects. In other words, the reverberation signal processing is split up in an early reverberation signal that is provided for two acoustic environments in parallel and a later reverberation signal, which is provided for one respective acoustic environment only at a point in time, and switched.

In a step of combining the first and second early reflections signals, the audio system uses a fading process to create a transitional early reflections signal. This signal represents a transition from the first early reflections signal to the second early reflections signal, ensuring a smooth and continuous audio playback experience as the user moves between environments.

In a step of providing an output audio signal, the audio system generates an output signal that includes a combination of the direct input audio signal and the transitional early reflections signal. This combined output signal creates a realistic and immersive audio experience for the user, simulating the sound of the virtual environment.

A computing device is configured for processing an audio signal by a method according to the present disclosure, the computing device comprising a memory, an interface, and at least one processing unit, the memory containing instructions executable by said at least one processing unit, wherein execution of the instructions causes the computing device to execute any method or combination of methods according to the present disclosure.

A computer program, or computer program product, comprises program code to be executed by at least one processor of a computing device. Therein, the execution of the program code causes the at least one processor to execute one of the methods for processing an audio signal according to the present disclosure.

A computer-readable storage medium comprises instructions which, when executed by a processor, cause the processor to carry out any method or combination of methods according to the present disclosure.

For such a computing device, audio system, computer program, and computer-readable storage medium for processing an audio signal, technical effects may be achieved, which correspond to the technical effects described for the methods and audio system for processing an audio signal.

It is to be understood that the features mentioned above and features yet to be explained below can be used not only in the respective combinations indicated, but also in other combinations or in isolation, without departing from the scope of the present disclosure. In particular, the features mentioned above and those yet to be explained below may be used not only in the respective combinations indicated, but also in other combinations or in isolation without departing from the scope of the disclosure.

Therefore, the above summary is merely intended to give a short overview over some features of some embodiments and implementations and is not to be construed as limiting. Other embodiments may comprise other features than the ones explained above.

BRIEF DESCRIPTION OF THE DRAWINGS

These and other objects of the disclosure will be appreciated and understood by those skilled in the art from the detailed description of the preferred embodiments and the following drawings in which like reference numerals refer to like elements.

DETAILED DESCRIPTION

Figure 1:
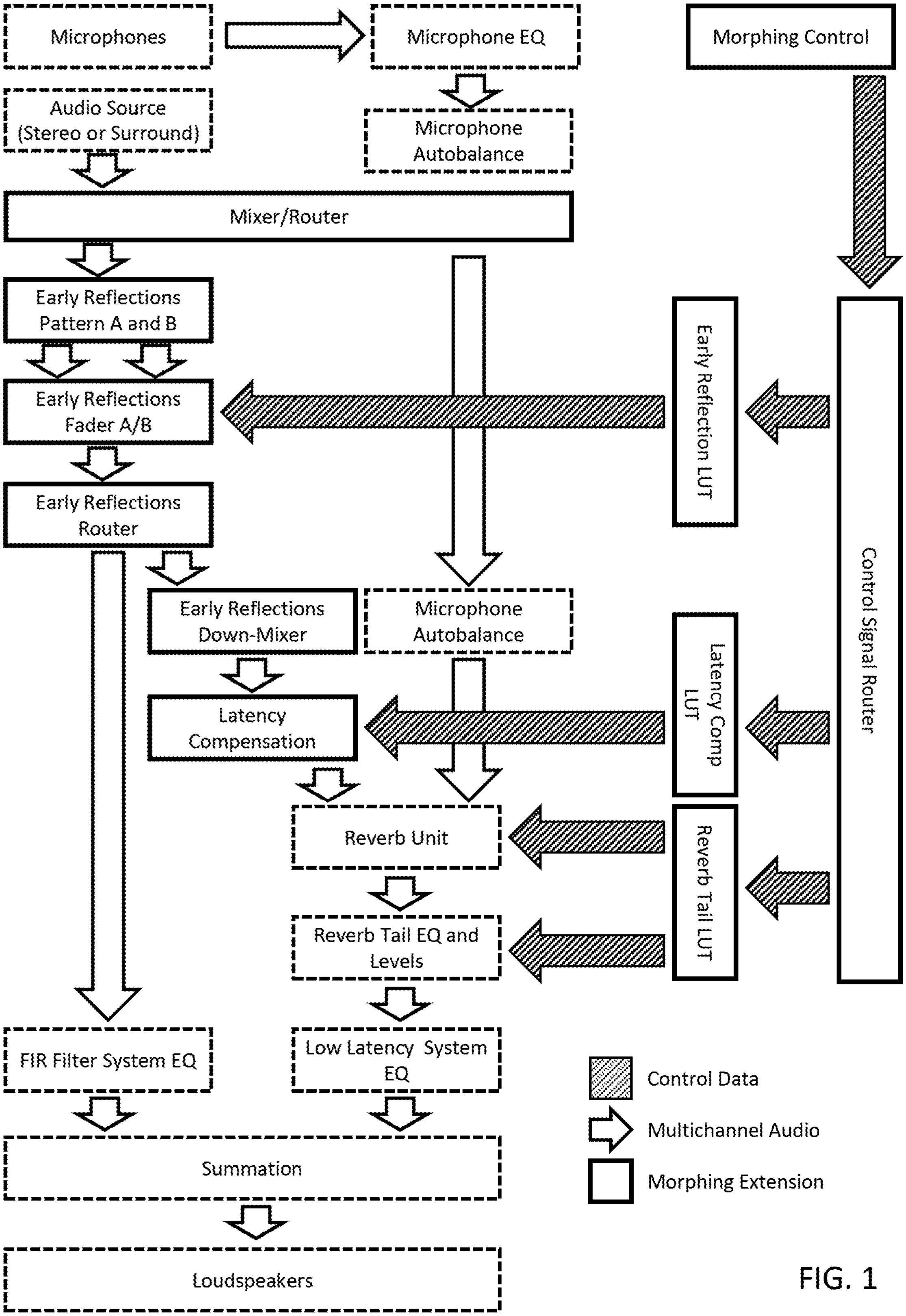
FIG. 1 schematically illustrates a flow chart for audio signal and control signal flow in an audio system, according to various embodiments.

In the following, embodiments of the disclosure will be described in detail with reference to the accompanying drawings. It should be understood that the following description of embodiments is not to be taken in a limiting sense. The scope of the invention is not intended to be limited by the embodiments described hereinafter or by the drawings, which are taken to be illustrative examples of the general inventive concept. The features of the various embodiments may be combined with each other, unless specifically noted otherwise.

Some examples of the present disclosure generally provide for a plurality of circuits, data storages, connections, or electrical devices such as e.g. processors. All references to these entities, other electrical devices, and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques will be described that relate to transitioning between different reverberation settings or adapting reverberation parameters, while maintaining continuous audio playback, without compromising sound quality or introducing unwanted artifacts.

FIG. 1 schematically illustrates a flow chart for audio signal and control signal flow in an audio system, according to various embodiments.

As described in conjunction with FIG. 1, an audio signal processing method enhances the listener's experience by providing a seamless transition between two acoustic environments. The techniques can be particularly relevant in live room reverberation technology, where a continuous audio playback is desired even as room reverberation parameters change. The disclosed embodiments achieve this by splitting the reverberation tail processing and early reflection processing, thus maintaining continuous audio playback while the user changes into a different venue or an intermediate parameter set between two virtual venues.

The audio signal flow in this live room reverberation technology involves processing both an input audio signal, also referred to as audio source signal, for example music, conferencing or entertainment audio, and a microphone signal capturing audio input, e.g. speech, from a person within a listening environment, such as the interior of a car.

The flow chart of the signal processing method begins with an audio source providing an input audio signal, which can be in stereo or surround format. The input audio signal is sent via a Mixer/Router, where it can be mixed with an additional microphone signal, to a processing unit that generates early reflections signals based on early reflections patterns of two different acoustic environments, e.g. room A and room B. The early reflections signals can be created in 3D surround format to provide a realistic audio experience.

In the Early Reflections Pattern A and B audio processing step, which can be performed by corresponding processing unit, the distinctive early reflections for both room A and room B are generated. Both patterns are simultaneously provided as output of the step. The two separate early reflections audio signals then enter a multi-channel fader, referred to as Early Reflections Fader A/B, which fades between the early reflections patterns of room A and room B, depending on a control signal. This fading process generates a transitional early reflections signal that represents a continuous and seamless blend of the first and second early reflections signals, including a mixture of initial sound reflections in the first and second acoustic environments.

In other words, the audio source signal (stereo or surround) is initially processed to generate distinctive early reflections signals for two different acoustic environments in parallel. These patterns are then combined, i.e. blended using a fading process, by the multi-channel fader, into a transitional early reflections signal comprising a gradual transition from the first to the second early reflections signal. Afterward, the transitional early reflections signal and the direct signal are distributed to an Early Reflections Router.

From the Early Reflections Router, the direct input audio signal and the transitional early reflections signal are routed to a multi-channel 3D surround system to generate a 3D audio signal, which is further provided to a FIR Filter System EQ unit. The FIR Filter System EQ applies a system equalization for the reproduction room on a loudspeaker level, ensuring that the audio signal is optimized for the specific listening environment, and provides it to a summation step. The combined direct and early reflections signal is to be continuously provided to a listener, even when a transition between reverberation parameters is to be made.

From the Early Reflections Router, the direct audio signal and the transitional early reflections signal are further distributed to an Early Reflections Down-Mixer. The Early Reflections Down-Mixer creates a downmix of the direct sound and early reflections signal (combined direct/early reflections signal) to a 2-channel stereo or any other format that can be processed by a reverberation engine or unit. This downmix allows for compatibility with various audio formats and systems.

Latency compensation based on a latency control signal is applied to the combined direct and transitional early reflections signal from the Down-Mixer to synchronize the continuous direct and early reflections signal, and the audio signal including a reverberation tail signal to be generated. This synchronization ensures that the output audio signal remains coherent and free of artifacts during the transition between the two acoustic environments.

The latency compensation is performed by a Latency Compensation unit to synchronize the reverberation tail signal, which is to be generated in the reverberation unit, and the direct signal including early reflections. This synchronization is achieved by controlling the latency compensation unit with a control signal based on a latency computing Look-Up-Table (LUT). The audio signal is then sent to the reverberation unit, which creates the reverberation tail.

In the reverberation unit, the reverberation tail is generated for the direct/early reflections signal, using a parameter set provided by a Reverberation Tail LUT. When the parameters change from the first set of reverberation parameters to the second set of reverberation parameters, the reverberation unit may experience a short mute phase to rebuild the reverberation network. However, the direct signal and early reflections are not affected by this mute phase, providing continuous audio to the FIR Filter System EQ and summation step.

The reverberation tail's tonal character is shaped with a Reverberation Tail EQ and Level unit, which is controlled by a reverberation control signal, in particular a Reverberation Tail LUT. The filtered multichannel audio is then sent to a Low Latency System EQ unit, which also provides a system EQ for the reproduction room on a loudspeaker level, and is also controlled by a reverberation control signal based on the Reverberation Tail LUT.

Simultaneously, an additional microphone signal, which captures the speech of the person inside the car, is received and linearized by a Microphone EQ unit. The linearized microphone signal is then levelized by a microphone balancing unit before being sent, via the Mixer/Router and an optional additional microphone balancing unit, to the reverberation unit. The reverberation unit can include the microphone signal of the user in the respective acoustic environment when processing the microphone signal based on the first or second set of reverberation parameters. Thereby, also the user voice can be output over the audio system loudspeakers with the same reverberation effects, for example a corresponding reverberation tail signal, as the input audio signal. The microphone signal can accordingly be included in the output signal of the reverberation unit. It would also be possible to apply the early reflections and reverb tail reverberation processes, or just the early reflection reverberation process, to the microphone signal.

The output of the FIR Filter System EQ and the Low Latency System EQ are summed in a summation step, and the resulting audio signal is provided to the loudspeakers for playback.

The described method allows for the continuous output of the audio signal to the user while transitioning from the first early reflections signal to the second early reflections signal, ensuring an uninterrupted listening experience. As the user dials in a new venue or changes the parameters of the current venue, the transitional early reflections signal represents a blend of initial sound reflections in the first and second acoustic environments, providing a smooth and seamless transition.

The method in particular includes processing the direct input audio signal based on the first set of reverberation parameters to generate a first reverberation tail signal and based on the second set of reverberation parameters to generate a second reverberation tail signal. The output audio signal comprises a combination of the direct input audio signal, the transitional early reflections signal, and the first reverberation tail signal. During the continuous playback of the output audio signal, the system switches from the first reverberation tail signal to the second reverberation tail signal, providing an output audio signal that includes the direct input audio signal, the transitional early reflections signal, and the second reverberation tail signal.

Early reflections refer to the initial sound reflections that reach the listener shortly after the direct sound, usually within the first few milliseconds. These reflections provide important spatial cues and contribute to the perception of the room's size and shape. In other words, early reflections refer to the audio signal that is generated by simulating the initial sound reflections in a room or an acoustic environment. This early reflections signal can then be mixed with the direct audio signal to create the complete audio signal to be played back. By combining the direct sound and early reflections, the resulting audio playback simulates a more realistic and spatially accurate listening experience, as it mimics how sound behaves in real-world environments.

Reverberation tail, on the other hand, refers to the later part of the reverberation, consisting of numerous, complex reflections that gradually decay over time. The reverberation tail contributes to the overall ambience and character of a space. In other words, the reverberation tail is implemented by simulating the complex, later reflections that occur in a room or an acoustic environment after the early reflections have taken place. This process typically involves using digital signal processing techniques, such as convolution or algorithmic reverberation, to generate a dense series of echoes that decay over time, creating the perception of a natural, sustained reverberation. The reverberation tail can be mixed with the audio signal containing both the direct sound and early reflections. This combination results in a complete audio playback that simulates the full range of reverberation present in a real-world acoustic environment, providing an immersive and natural-sounding listening experience.

The direct audio signal represents the unprocessed sound that travels directly from the sound source to the listener without any reflections or reverberations. This signal provides the primary sound information and is combined or summed with the early reflection signals and reverberation tail signals to create a complete and realistic representation of the acoustic environment.

Therefore, the transitional early reflections signal represents a continuous and seamless audio signal representing a blend of initial sound reflections in the first and second acoustic environments. The first acoustic environment may correspond to a first virtual venue, and the second acoustic environment may correspond to a second virtual venue or a user-induced parameter change of at least one parameter of the first set of parameters. Both the first and second early reflections signals are provided simultaneously, ensuring that the transitional early reflections signal remains uninterrupted during the fading process.

The first and second reverberation tail signals comprise synthesized audio signals representing the late sound reflections and decay characteristics occurring within the respective acoustic environments, subsequent to the early reflections within the respective acoustic environments. These reverberation tail signals can further be generated using the microphone signal received from the user, taking into account the user's position in the respective acoustic environments.

The final output from the summation step to the loudspeakers is a continuous audio playback that allows seamless adjustments of reverberation parameters, while maintaining the direct signal and early reflections throughout the process. This provides a smooth transition between different virtual acoustic environments and ensures that the speech captured by the microphone is also played back with the desired reverberation effect.

The acoustic environments in this live room reverberation technology can be representations of virtual or real spaces that are different from the current listening room. These environments may include concert halls, theaters, churches, stadiums, or even outdoor settings like forests, canyons, or urban streets. By simulating the acoustic properties of these environments, the system provides the listener with an immersive experience, making it feel as if they are in a completely different space while remaining in their current listening room, such as the interior of a car. This seamless adjustment of reverberation parameters enhances the listening experience by creating a realistic representation of various acoustic environments for both the audio source signal and the captured speech from the microphone.

The generation of the first and second reverberation tail signals is controlled using a reverberation tail control signal based on a reverb tail lookup table (LUT) containing the reverberation tail parameters of the first and second acoustic environments. This control signal enables the system to accurately reproduce the reverberation characteristics of the selected environments during the transition.

Also based on the reverb tail LUT, an equalization filter is applied to the first and second reverberation tail signals to shape the tonal character of the reverberation tail. This equalization ensures that the reverberation tail signals blend smoothly with the direct input audio signal and the transitional early reflections signal.

The reverberation tail audio signal can be switched discretely between the first and second parameter settings.

The input audio signal can be a multi-channel audio signal, allowing the system to accommodate a variety of audio formats and playback environments. The fading process is adaptive based on a user input controlling the blend of the first and second early reflections signals in the transitional early reflections signal, allowing the user to fine-tune the transition between the two acoustic environments.

The first and second sets of reverberation parameters are derived from a database of real-world or virtual acoustic environments, ensuring that the generated early reflections and reverberation tail signals accurately represent the acoustic characteristics of the selected environments.

In conclusion, this computer-implemented method for audio signal processing enables seamless transitions between different acoustic environments in live room reverberation technology. By splitting reverberation tail processing and early reflection processing, the disclosed embodiments maintain continuous audio playback while allowing the user to dial in new venues or intermediate parameter sets between two venues. The transitional early reflections signal, which is a blend of the first and second early reflections signals, ensures a smooth and uninterrupted listening experience.

This method offers significant advantages for various audio applications, such as live sound reinforcement, virtual reality audio, and immersive audio experiences in movies and video games. By providing a realistic and seamless transition between different acoustic environments, the method enhances the listener's immersion and engagement with the audio content.

The adaptive fading process allows users to fine-tune the blend of the first and second early reflections signals in the transitional early reflections signal, granting them greater control over the audio experience. In addition, the multi-channel audio signal support ensures that the system can accommodate a wide range of audio formats and playback environments, making it suitable for various audio applications.

The latency compensation feature synchronizes the direct audio signal, early reflections signal, and the reverberation tail signal, ensuring a coherent and artifact-free output audio signal during the transition between acoustic environments. The equalization filter applied to the first and second reverberation tail signals shapes the tonal character of the reverberation tail, contributing to the smooth blending of the signals in the output audio.

The use of real-world or virtual acoustic environment databases for generating the first and second sets of reverberation parameters ensures that the early reflections and reverberation tail signals accurately represent the selected environments' acoustic characteristics. This feature contributes to the realism and immersion of the audio experience.

The inventive audio signal processing method could further possibly include incorporating the microphone signal into the early reflections processing, allowing for a more realistic and immersive audio experience. Additionally, the system can implement fading between different reverberation tail signals for smoother and more seamless transitions between acoustic environments. Furthermore, the signal processing can be divided into three or more signals, such as early reflections, mid reflections, and late reverberation, for which a similar fading process can be performed, providing users with granular control over the blending and transitioning between different acoustic environments. Alternative methods for controlling the reverberation tail switching, such as machine learning algorithms or predictive models, can be explored to improve the efficiency and accuracy of the transitions between the tails, potentially leading to a more immersive and realistic audio experience.

Thereby, the inventive audio signal processing method provides an effective solution for seamless transitions between different acoustic environments in various audio applications. By maintaining continuous audio playback and offering a smooth and immersive listening experience, this method significantly enhances the user's engagement with the audio content. Its adaptability and compatibility with a wide range of audio formats and playback environments make it suitable for a broad spectrum of applications, from live sound reinforcement and virtual reality audio to immersive audio experiences in movies and video games.

Figure 2:
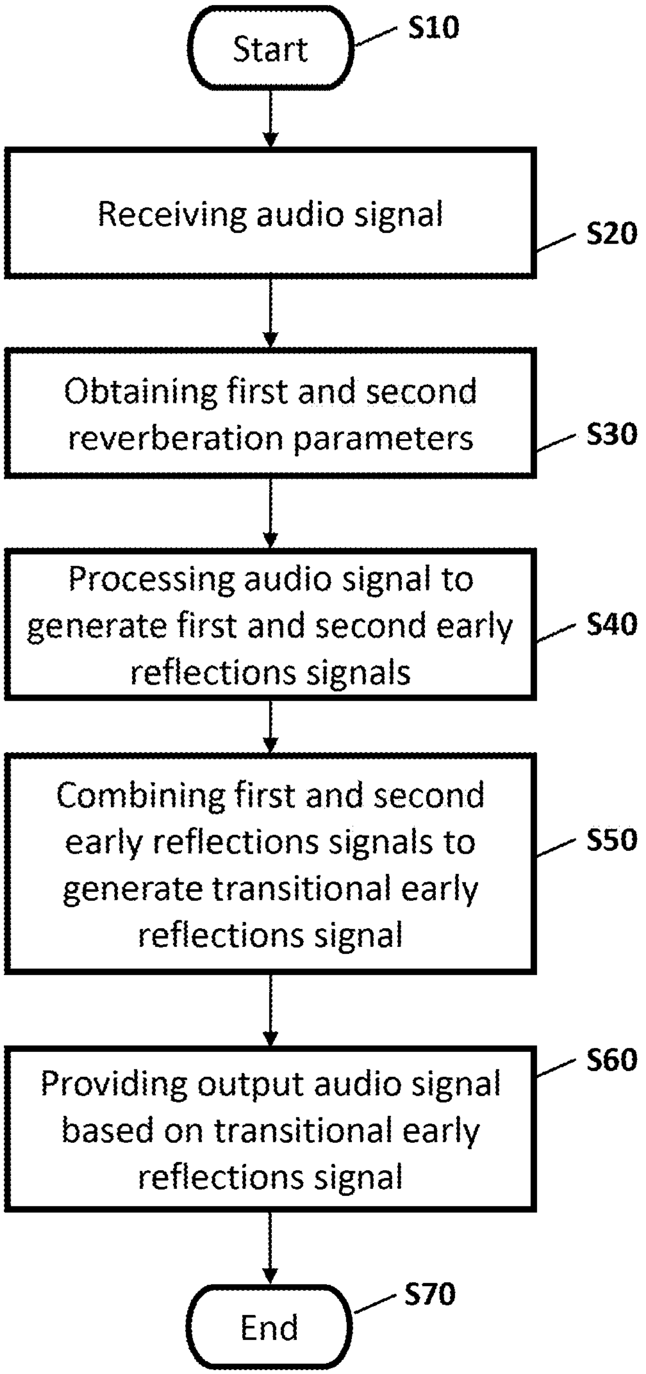
FIG. 2 schematically illustrates steps of a method for processing an audio signal, according to various embodiments.

FIG. 2 schematically illustrates steps of a method for processing an audio signal, according to various embodiments.

The method starts in step S10. In step S20, an input audio signal is received, which is to be output to a user with reverberation. In step S30, a first set of reverberation parameters associated with a first acoustic environment is obtained, and a second set of reverberation parameters associated with a second acoustic environment, different from the first set of reverberation parameters, is also obtained.

In step S40, the input audio signal is processed based on the first set of reverberation parameters to generate a first early reflections signal, and simultaneously, based on the second set of reverberation parameters to generate a second early reflections signal. Each of the first and second early reflections signals comprises a respective synthesized audio signal representing initial sound reflections in the respective acoustic environment.

In step S50, the first and second early reflections signals are combined through a fading process to generate a transitional early reflections signal, which comprises a transition from the first to the second early reflection signal in accordance with the fading process.

Finally, in step S60, an output audio signal is provided based on the transitional early reflections signal. The method ends in step S60.

Figure 3:
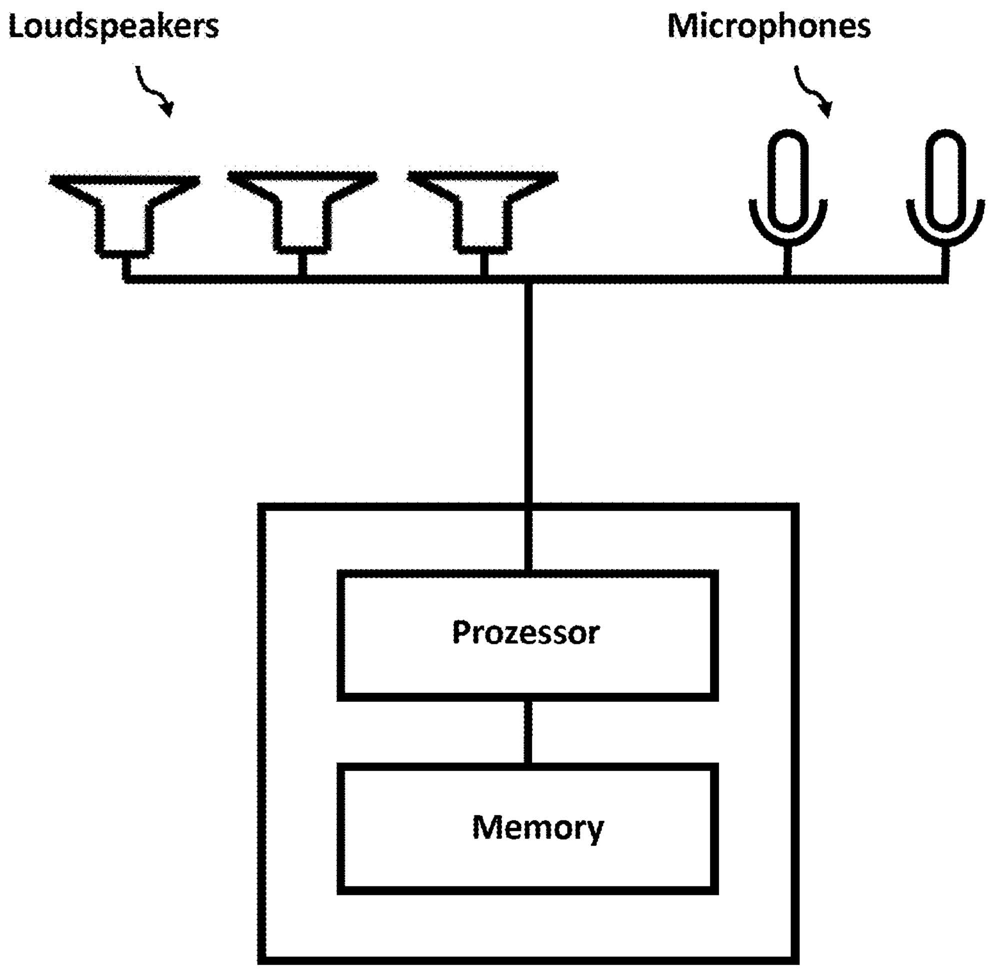
FIG. 3 schematically illustrates an audio system, according to various embodiments.

FIG. 3 schematically illustrates an audio system, according to various embodiments.

As seen in FIG. 3, an audio system consists of a processing device, loudspeakers, and one or more microphones. The processing device includes a processor and a memory, which work together to handle the audio processing tasks. The loudspeakers are responsible for playing back the processed audio, while the microphone captures sound input to be processed by the system. This audio system works in conjunction with the described disclosed embodiments to provide continuous audio playback with changing room reverberation parameters, From the above said, the following general conclusions can be drawn. According to the general idea, continuous audio playback of an audio signal is enabled in a live room reverberation technology, while room reverberation parameters are changed. This is achieved by splitting the reverberation tail processing and early reflection processing. By simultaneously providing early reflection patterns (i.e. audio signals) for two different virtual venues (rooms A and B) and using a multi-channel fader to fade between these audio signals, the disclosed embodiments allow for smooth transitions without muting the audio when changing parameters or switching between venues. This enhances the user experience and allows for more flexibility in adjusting the reverberation settings during live performances or audio production.

Fading between the two different early reflections signals may involve a gradual transition or blending process, where one signal's amplitude is progressively reduced while the other signal's amplitude is simultaneously increased. In such a way, the contribution of the first and second early reflections signal in the transitional early reflections signal gradually changes. This process allows for a smooth and continuous change between the two signals, enabling any intermediate step or combination of the signals. Fading between audio signals creates a seamless transition that minimizes abrupt changes and enhances the listening experience, making it ideal for applications such as crossfading between tracks, transitioning between different audio effects, or blending audio sources in virtual environments. Such a process may also be described as gradually combining the signals or transitioning/blending between the signals.

The fading process can be described in various ways, such as gradually changing, fading between, transitioning, or combining the first and second early reflections signals. This process allows for the creation of an intermediate parameter set that represents a smooth progression between the first and second early reflections signals.

During this process, the transitional early reflections signal is generated by gradually adjusting the contribution of each early reflections signal, ensuring a seamless transition between the two acoustic environments. This approach allows for a continuous audio playback experience, as the user can perceive the changes in the reverberation parameters without experiencing any abrupt shifts or interruptions in the audio output.

In other words, transitioning between two audio signals comprises a smooth and progressive adjustment, wherein one signal's intensity decreases as the other signal's intensity rises. This method facilitates a continuous shift between the signals, accommodating any intermediate blend or proportion. Such seamless transitions are essential for minimizing sudden changes, improving the listening experience, and are well-suited for applications like crossfading between songs, moving between distinct audio effects, or merging audio sources in simulated spaces. Gradually combining, while transitioning between two audio signals, may consists of a gradual and continuous alteration, where the volume of one signal is reduced while the volume of the other signal is concurrently raised. This process enables a seamless change between the two signals, allowing for any intermediate mixture or balance. Seamless fading is crucial for preventing abrupt shifts and enhancing the overall auditory experience, making it perfect for scenarios blending or transitioning between different reverberation setting within virtual environments.

In the audio signal processing method, the first and second early reflections signals are calculated and provided simultaneously, along with the first tail signal. This simultaneous processing enables a smooth and seamless transition between the two acoustic environments, as the early reflections signals are faded from one to the other, creating a transitional early reflections signal.

While the early reflections signals are being faded and combined, the first tail signal is applied to the audio output. The tail signals may not be provided simultaneously or faded like the early reflections signals. Instead, the first tail signal is processed and applied to the audio output during the early reflections fading process.

Once the early reflections fading process is complete or during the fading process, the tail signal is then switched from the first tail signal to the second tail signal. This switching may occur without simultaneous processing or fading of the tail signals. The resulting audio output now comprises the direct input audio signal, the transitional early reflections signal, and the second tail signal, reflecting the change in the acoustic environment.

This approach ensures that the audio experience remains uninterrupted while the listener transitions between the two environments. The simultaneous calculation and provision of the first and second early reflections signals, combined with the application of the first tail signal, allows for a smooth fading process. Meanwhile, the reverberation tail signals are not processed simultaneously; they are switched during continuous playback to complete the transition to the new acoustic environment.

An early reflections signal may be a synthesized audio signal that represents the initial series of sound reflections occurring within an acoustic environment shortly after the direct sound is produced. These reflections result from sound waves bouncing off surfaces such as walls, ceilings, and floors in the environment, and they typically reach the listener within the first few milliseconds after the direct sound.

The early reflections signal is generated through various audio processing techniques, such as digital signal processing algorithms or convolution with impulse responses, to simulate the spatial and temporal characteristics of the early reflections. This synthesized signal captures important information about the size, shape, and acoustic properties of the virtual or physical space, providing crucial spatial cues and contributing to the perception of depth and realism in the listening experience.

When the early reflections signal is combined with the direct audio signal, it creates a more immersive and spatially accurate audio playback, as it replicates the natural behavior of sound in real-world environments. The early reflections signal plays a significant role in audio processing applications, such as room simulation, virtual reality, and 3D audio rendering, where recreating realistic and convincing acoustic environments is essential.

Outputting the audio signal based on the transitional early reflection signal, may comprise providing, as an output signal, a combination of the direct (i.e. original) audio signal and the transitional early reflections signal.

It is to be understood that fading between the two early reflection signals can be achieved in various ways, including directly mixing the early reflection signals or combining them first with other signals, such as the direct audio, before performing the fade. In either approach, the objective is to ensure that in the output signals, the effect of the first early reflections progressively fades while the effect of the second early reflections increases. This process continues until one of the early reflection signals becomes the sole influence on the output, resulting in a smooth and seamless transition between the two early reflection signals and their respective acoustic characteristics. Therefore, all fading combinations of signals, that have the effect that the influence of the first early reflection signal on the listening experience diminishes and the influence of the second early reflection signal on the listening experience increases, should be included. In other words, fading between the first and the second reverberation signals to generate a transitional early reflections signal, which is a combination of the first and the second reverberation signals based on the fading characteristic.

The method may optionally comprise the steps of receiving or requesting the first set of reverberation parameters, which correspond to a first (virtual) reverberation setting or scenario, for which reverberation is to be applied to the input audio signal, and the second set of reverberation parameters, which correspond to a second (virtual) reverberation setting or scenario, for which reverberation is to be applied to the input audio signal.

Processing based on the first and second set of reverberation parameters can be performed simultaneously or in parallel, wherein the first and second early reflections signals can be provided simultaneously, i.e. substantially at the same time and/or in parallel to each other, for example in real-time synchronized with the microphone signal.

The input audio signal is to be reverberated, in other words, the input audio signal is intended for reverberation processing or undergoes reverberation processing, in other words the purpose of processing the input audio signal is to apply reverberation effects to it. Accordingly, the input audio signal undergoes reverberation processing according to various reverberation settings, parameters, situations, and virtual room or venue characteristics, wherein the reverberation applied to the input audio signal can be adjusted and customized based on different sets of reverberation parameters.

The audio signal that includes the early reflections can be referred to as the early reverberation signal, which can be a combination of the original (direct) audio signal and the early reflections, forming the initial part of the reverberation process.

The first reverberation signal can represent an early reflection pattern of the audio signal based on the first reverberation parameters, i.e., a first reverberation setting or situation, and the second reverberation signal represents an early reflection pattern of the audio signal based on the second reverberation parameters, i.e., a second reverberation setting or situation. The first and second reverberation parameters, reverberation settings can be different from each other.

The first set of reverberation parameters may correspond to a first reverberation setting, in particular to a first virtual room or virtual venue, such that the first reverberation signal represents the first reverberation setting. Accordingly, the second set of reverberation parameters may correspond to a to a second reverberation setting, in particular to a second virtual room or virtual venue, such that the second reverberation signal represents the second reverberation setting.

Initially, the direct audio signal is combined with the transitional early reflections signal, which is created through the fading process of the first and second early reflections signals. This combination of the direct audio signal and the transitional early reflections signal represents the spatial characteristics of the acoustic environment and is output continuously during the fading process.

While the early reflections fading process is occurring, the first reverberation tail signal is applied to the audio output. The reverberation tail signal is not combined with the direct audio signal and the early reflections signal simultaneously. Instead, it is processed and applied separately during the continuous playback of the output audio signal.

Once the early reflections fading process is complete and the transitional early reflections signal has been established, the reverberation tail signal is then switched from the first tail signal to the second tail signal. This switching ensures that the reverberant qualities of the new acoustic environment are accurately represented.

By processing and combining the direct audio signal, the early reflections signal, and the reverberation tail signal sequentially, the audio signal processing method maintains the continuity and integrity of the audio output while transitioning between different acoustic environments.

Summarizing, a computer-implemented method for audio signal processing involves receiving an input audio signal, obtaining reverberation parameters associated with two distinct acoustic environments, and simultaneously generating early reflections signals for each acoustic environment. These early reflections signals are then combined through a fading process to create a continuous transitional early reflections signal, which transitions between the two environments according to the fading process. Additionally, a reverberation tail is generated and combined with the transitional early reflections signal. The output audio signal is provided as a combination of the direct input audio signal, the transitional early reflections signal, and the reverberation tail, resulting in a seamless and immersive listening experience for the user.

The provided techniques provide an improved method of reverberation transition that allows for continuous audio playback while room reverberation parameters are changed, without introducing artifacts or adversely affecting the sound quality. The provided techniques enhance the user experience, enabling seamless transitions between different virtual venues and facilitating real-time adjustments to the reverberation settings during live performances, recording sessions, and other multimedia applications. Seamless reverberation transition maintains continuous audio playback while room reverberation parameters are changed, without compromising sound quality or introducing unwanted artifacts.

It is to be understood that the described techniques have been described with regard to an audio system in a vehicle, however it is clear that they can be used with any system that comprises playing an audio signal for a user, wherein the audio signal is provided with reverberation according to changing reverberation settings. Similar techniques may be readily applied to other kinds and types of audio systems, such as for example buildings, or electronic consumer devices.

Although the disclosed techniques have been described with respect to certain preferred embodiments, equivalents and modifications will occur to others skilled in the art upon the reading and understanding of the specification. The present disclosure includes all such equivalents and modifications and is limited only by the scope of the appended claims.

What is claimed is:

1. A computer-implemented method for audio signal processing by an audio system comprising a processing unit, the computer-implemented method comprising:
   receiving an input audio signal;
   obtaining a first set of reverberation parameters associated with a first acoustic environment;
   obtaining a second set of reverberation parameters associated with a second acoustic environment, the second set of reverberation parameters being different from the first set of reverberation parameters;
   simultaneously processing the input audio signal by:
      generating a first early reflections signal based on simulating first-occurring sound reflections of the input audio signal within the first acoustic environment using the first set of reverberation parameters, and
      generating a second early reflections signal based on simulating first-occurring sound reflections of the input audio signal within the second acoustic environment using the second set of reverberation parameters;
   combining the first and second early reflections signals through a fading process to generate a transitional early reflections signal, which comprises a transition from the first to the second early reflection signal in accordance with the fading process; and
   providing an output audio signal comprising a combination of the input audio signal and the transitional early reflections signal.

2. The computer-implemented method of claim 1, wherein;
   simulating the first-occurring sound reflections of the input audio signal within the first acoustic environment comprises simulating the first-occurring sound reflections before a predetermined time threshold using the first set of reverberation parameters; and
   simulating the first-occurring sound reflections of the input audio signal within the second acoustic environment comprises simulating the first-occurring sound reflections before the predetermined time threshold using the second set of reverberation parameters.

3. The computer-implemented method of claim 1, further comprising:
   continuously outputting the output audio signal to a user, while transitioning from the first early reflections signal to the second early reflections signal.

4. The computer-implemented method of claim 1, further comprising:
   processing the input audio signal based on the first set of reverberation parameters to generate a first reverberation tail signal, and based on the second set of reverberation parameters to generate a second reverberation tail signal;
   providing the output audio signal comprising a combination of the input audio signal, the transitional early reflections signal, and the first reverberation tail signal; and
   during continuous playback of the output audio signal, switching from the first reverberation tail signal to the second reverberation tail signal to provide the output audio signal comprising the input audio signal, the transitional early reflections signal, and the second reverberation tail signal.

5. The computer-implemented method of claim 4, wherein the first and second reverberation tail signals comprise a synthesized audio signal representing late sound reflections and decay characteristics occurring within the respective acoustic environment subsequent to the first and second early reflections signals within the respective acoustic environment.

6. The computer-implemented method of claim 4, further comprising:
   receiving a microphone signal, which comprises an audio signal from a user; and
   generating the first and second reverberation tail signal further based on the microphone signal.

7. The computer-implemented method of claim 6, wherein processing the microphone signal based on the first or second set of reverberation parameters further takes into account a position of a user in the respective acoustic environment.

8. The computer-implemented method of claim 4, wherein the generating the first and second reverberation tail signals is controlled using a reverberation tail control signal based on a lookup table containing reverberation tail parameters of the first and second acoustic environments.

9. The computer-implemented method of claim 4, further comprising:

applying an equalization filter to the first and second reverberation tail signals.

10. The computer-implemented method of claim 1, wherein the transitional early reflections signal is a continuous and seamless audio signal representing a blend of initial sound reflections in the first and second acoustic environments.

11. The computer-implemented method of claim 1, wherein:

the first acoustic environment corresponds to a first virtual venue, and the second acoustic environment corresponds to a second virtual venue; or the second acoustic environment corresponds to a user-induced parameter change of at least one parameter of the first set of parameters.

12. The computer-implemented method of claim 1, wherein first early reflections signal and second early reflections signal are provided simultaneously.

13. The computer-implemented method of claim 1, further comprising:

compensating for latency in the transitional early reflections signal to synchronize the input audio signal, early reflections signal, and/or reverberation tail signal based on a latency control signal.

14. The computer-implemented method of claim 1, wherein the input audio signal is a multi-channel audio signal.

15. The computer-implemented method of claim 1, wherein the fading process is adaptive based on a user input controlling blending of the first-occurring sound reflections in the first and second early reflections signals in the transitional early reflections signal.

16. The computer-implemented method of claim 1, further comprising:

routing the input audio signal and the transitional early reflections signal to a multi-channel 3D surround system to generate a 3D audio signal; and providing the 3D audio signal to a system equalization filter for reproduction room compensation on a loudspeaker level to generate the output audio signal.

17. The computer-implemented method of claim 1, wherein the first and second sets of reverberation parameters are derived from a database of real-world or virtual acoustic environments.

18. An audio system comprising:

a memory storing instructions; and at least one processing unit, which when executing the instructions is configured to perform the steps of:

receiving an input audio signal;

obtaining a first set of reverberation parameters associated with a first acoustic environment;

obtaining a second set of reverberation parameters associated with a second acoustic environment, the second set of reverberation parameters being different from the first set of reverberation parameters;

simultaneously processing the input audio signal by:

generating a first early reflections signal based on simulating first-occurring sound reflections of the input audio signal within the first acoustic environment using the first set of reverberation parameters, and generating a second early reflections signal based on simulating first-occurring sound reflections of the input audio signal within the second acoustic environment using the second set of reverberation parameters;

combining the first and second early reflections signals through a fading process to generate a transitional early reflections signal, which comprises a transition from the first to the second early reflection signal in accordance with the fading process; and providing an output audio signal comprising a combination of the input audio signal and the transitional early reflections signal.

19. The audio system of claim 18, wherein the steps further comprise:

processing the input audio signal based on the first set of reverberation parameters to generate a first reverberation tail signal, and based on the second set of reverberation parameters to generate a second reverberation tail signal;

providing the output audio signal comprising a combination of the input audio signal, the transitional early reflections signal, and the first reverberation tail signal; and during continuous playback of the output audio signal, switching from the first reverberation tail signal to the second reverberation tail signal to provide the output audio signal comprising the input audio signal, the transitional early reflections signal, and the second reverberation tail signal.

20. One or more non-transitory computer readable media storing instructions that, when executed by one or more processors, cause the one or more processors to perform the steps of:

receiving an input audio signal;

obtaining a first set of reverberation parameters associated with a first acoustic environment;

obtaining a second set of reverberation parameters associated with a second acoustic environment, the second set of reverberation parameters being different from the first set of reverberation parameters;

simultaneously processing the input audio signal by:

generating a first early reflections signal based on simulating first-occurring sound reflections of the input audio signal within the first acoustic environment using the first set of reverberation parameters, and generating a second early reflections signal based on simulating first-occurring sound reflections of the input audio signal within the second acoustic environment using the second set of reverberation parameters;

combining the first and second early reflections signals through a fading process to generate a transitional early reflections signal, which comprises a transition from the first to the second early reflection signal in accordance with the fading process; and providing an output audio signal comprising a combination of the input audio signal and the transitional early reflections signal.

* * * * *